United States Patent [19]

Appolonia et al.

[11] Patent Number: 5,334,406
[45] Date of Patent: Aug. 2, 1994

[54] METHOD AND DEVICE FOR TRANSMITTING HEATING OR COOLING MEDIUM TO A FOOD PRODUCT ON A MOVING SUBSTRATE

[75] Inventors: Jack Appolonia, Yardley, Pa.; Robert Muscato, Monmouth Junction; George Wittel, Bridgewater Township, Somerset County, both of N.J.

[73] Assignee: The BOC Group, Inc., Murray Hill, N.J.

[21] Appl. No.: 23,299

[22] Filed: Feb. 26, 1993

[51] Int. Cl.⁵ .............. A23L 1/00; A21B 1/00; F25D 17/00
[52] U.S. Cl. .................. 426/520; 62/303; 62/374; 99/474; 99/477; 126/21 A; 426/524
[58] Field of Search .......... 426/520, 524; 62/374, 62/303; 99/474, 475, 477, 443 C; 126/21 A

[56] References Cited

U.S. PATENT DOCUMENTS

| | | | |
|---|---|---|---|
| 3,802,212 | 4/1974 | Martin et al. | 62/80 |
| 3,884,213 | 5/1975 | Smith | 126/21 A |
| 4,289,979 | 9/1981 | Smith | 426/241 |
| 4,338,911 | 7/1982 | Smith | 126/21 A |
| 4,465,701 | 8/1984 | Holman et al. | 426/520 |
| 4,479,776 | 10/1984 | Smith | 99/443 C |
| 4,626,661 | 12/1986 | Henke | 99/443 C |
| 4,757,800 | 7/1988 | Shei et al. | 126/21 A |
| 4,803,851 | 2/1989 | Stokes | 426/520 |
| 4,873,107 | 10/1989 | Archer | 126/21 A |
| 4,940,004 | 7/1990 | Randall et al. | 62/374 |
| 4,951,645 | 8/1990 | Luebke et al. | 126/21 A |
| 4,972,824 | 11/1990 | Luebke et al. | 126/21 A |

*Primary Examiner*—George Yeung
*Attorney, Agent, or Firm*—David A. Draegert; Larry R. Cassett

[57] ABSTRACT

A device for transmitting a heating or cooling medium to a moving substrate which includes at least one continuous channel traversing at least a major portion of the width of the moving substrate for converting a multidirectional flow of the heating or cooling medium into a unidirectional flow, a device for removing and/or preventing the presence of foreign matter within the channel, and ovens and freezers employing the same.

29 Claims, 10 Drawing Sheets

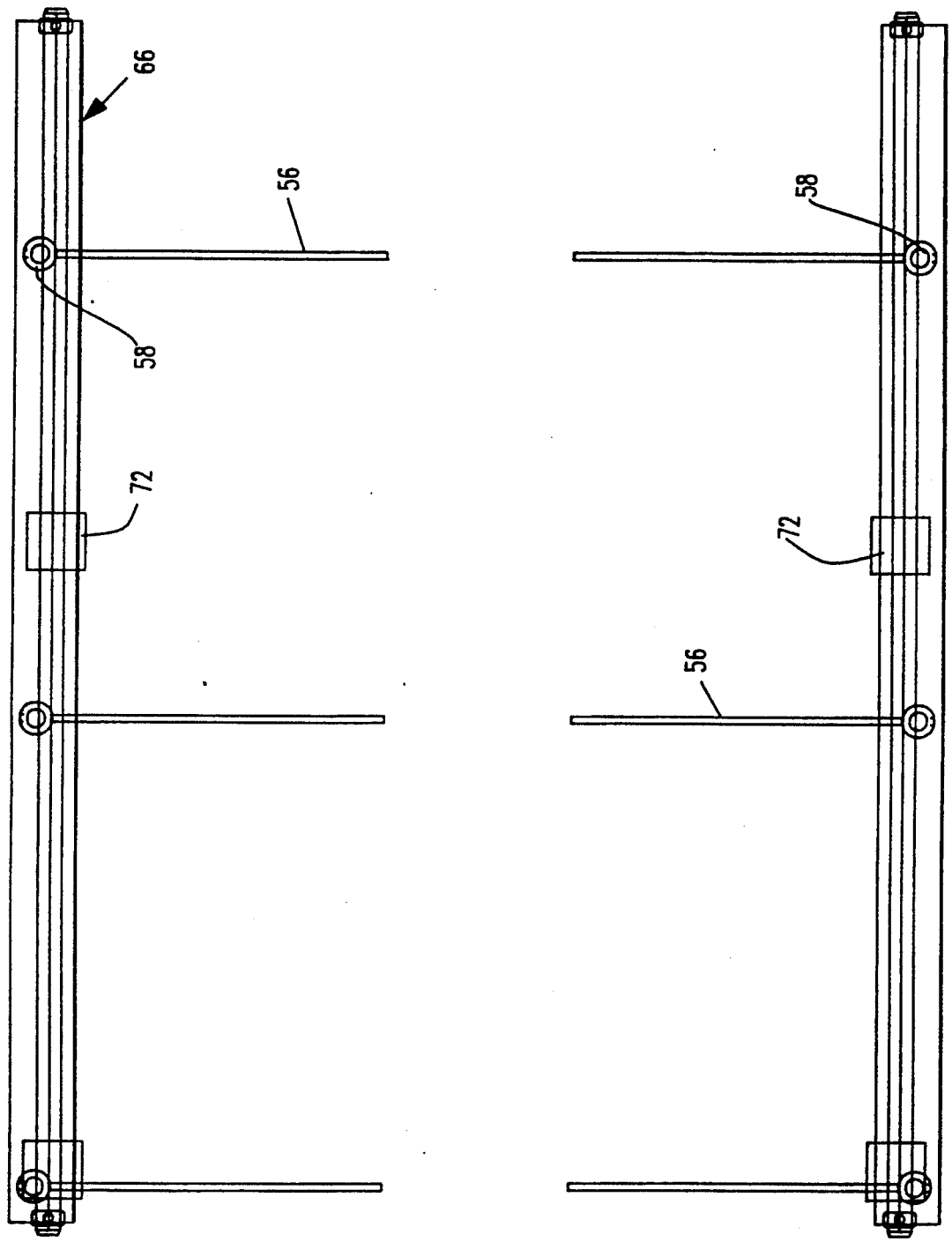

METHOD AND DEVICE FOR TRANSMITTING HEATING OR COOLING MEDIUM TO A FOOD PRODUCT ON A MOVING SUBSTRATE

TECHNICAL FIELD

The present invention is generally directed to a device for transmitting a heating or cooling medium to a moving substrate and particularly to a device for transmitting a cool vapor such as air within an impingement freezer for freezing food in which frost buildup is substantially eliminated.

BACKGROUND OF THE PRIOR ART

Commercial ovens and freezers typically rely on the transmission of a heating or cooling medium such as air to the food product by a large fan or blower. The fan or blower is situated proximate to a conveyor which carries the food through the heater or freezer for a time sufficient to heat or freeze the food product.

The food product entering the oven or freezer has a boundary layer composed primarily of stagnant air which insulates the food product from the surrounding atmosphere. In order to effect proper cooking or freezing, the boundary layer must be substantially reduced to expose the food product directly to the heating or cooling medium.

Conventional fans or blowers generate a multidirectional flow of the heating or cooling vapor. Much of the vapor is scattered about the freezer and only a portion of this scattered vapor reaches the food product. At least a significant portion of the blown vapor, therefore, does not directly impinge on the food product in a perpendicular direction. Under these conditions, the vapor which does contact the food product often does not possess sufficient energy to substantially reduce the boundary layer. This results in inefficient heating or freezing or requires excessively long exposures of the food product to the heating or freezing operation.

Efforts have been made to reduce the amount of heating or cooling vapor which is scattered about the freezer. This has been accomplished by employing a device within the oven or freezer which transforms the multidirectional air flow from the blower or fan into a unidirectional flow of air directly toward the food product which has sufficient energy to reduce the boundary layer.

For example, Donald P. Smith, U.S. Pat. Nos. 3,884,213, 4,289,792 and 4,338,911, disclose a cooking apparatus utilizing a series of spaced apart discrete jets of unidirectionally flowing air produced by appropriately spaced tubes.

Donald P. Smith, U.S. Pat. No. 4,479,776, discloses a heating/cooling apparatus having a thermal treatment zone for supplying columnated jets of a gas to the exterior surface of a food product moving relative thereto in combination with at least one equilibration zone for promoting heat transfer into or out of the interior portions of the food product. A number of vertical spaced apart tubes are positioned in the heating/cooling section to direct a unidirectional air flow toward the food product.

Mitchell C. Henke, U.S. Pat. No. 4,626,661, discloses the use of a plurality of nozzles spaced apart over the pathway of the food product for delivering discrete jets of unidirectional heating/cooling air. A plurality of high velocity air jets are also employed in Steven M. Shei, U.S. Pat. No. 4,757,800, in which impingement apertures direct heated air in a unidirectional manner to heat the food product passing on a conveyor.

Another approach to providing unidirectional flow of air in an oven is disclosed in Virgil L. Archer, U.S. Pat. No. 4,873,107. Instead of employing tubes for directing the heated air toward the food product as discussed above, there is provided a spaced array of rectangular slots. The multidirectional air from the fan or blower is caused to enter the slots and thereby attain a more orderly and direct flow toward the food product. A similar arrangement of rectangular slots is disclosed in Clement J. Luebke et al., U.S. Pat. No. 4,972,824.

Each of these heating/cooling devices provides an improvement over the use of fans and blowers alone because they generally produce a unidirectional flow of heating/cooling air having sufficient energy to reduce the boundary layer of the food product. However, such devices obtain these improvements by expending excessive energy to distribute the heating/cooling air to the food product. In addition, with respect to freezers, the tubes or slots used to form the unidirectional flow often become plugged with frost. The buildup of frost tends to degrade the freezing operation over a period of time. Frost reduces the amount of heat transferred from the food product and, therefore, as the time of the freezing operation increases, the efficiency of the transfer of heat from the food product to the atmosphere decreases. In order to remove the frost to keep the air passageway open, it has been necessary to shut down the freezer to melt the accumulated frost, resulting in delays and additional cost of the process.

Accordingly, it would be desirable to employ a device for transmitting a heating or cooling medium such as air to a substrate such as a food product on a conveyor belt in a more energy efficient manner by providing for better distribution of the heating/cooling medium across the width of the conveyor belt. It would also be of benefit to provide better distribution of the heating/cooling medium from the source (e.g. the fan or the blower) to the food product.

Furthermore, with respect to the freezing of food, it would be of significant benefit to prevent the buildup of frost in the freezer without having to terminate the freezing operation.

SUMMARY OF THE INVENTION

The present invention in its broadest aspects is generally directed to a device for transmitting a heating or cooling medium to a moving substrate such as a food product on a conveyor belt. The device comprises at least one continuous channel traversing at least a major portion of the width of the substrate for transforming a multidirectional flow of the heating or cooling medium into a unidirectional flow.

The continuous channel has a first opening for receiving the heating or cooling medium and a second opening for discharging the medium in proximity to the substrate. As the medium passes through the channel from the first to the second opening it is transformed into a unidirectional flow having sufficient energy to at least reduce the boundary layer of the food product. In addition, the continuous channel enables a greater rate of heat transfer from the food product than conventional systems employing intermittent (non-continuous) slots or tubes. In a preferred form of the invention, the first opening of the channel has a greater cross-sectional area than the second opening. The larger entrance area enables a greater volume of the medium to enter the channel and facilitates the transformation of the medium into a unidirectional flow.

In accordance with one aspect of the invention particularly related to the transmission of a cooling medium, means are provided for continuously cleaning the channel without having to terminate the freezing operation. The cleaning means is insertable into the channel and movable along at least a portion of the length thereof. The cleaning means comprises at least one projection, preferably in the form of a cleaning rod, extending into and along the height of each of the channels from the first to the second opening. The projections are movable within the channels along the length thereof and are adapted to loosely contact the walls of the channels as they move to remove and/or prevent the buildup of foreign matter including frost. The movement of the projections can be controlled in a manner which keeps the channels free of foreign matter while not interfering with the flow of the cooling medium through the channels.

In a further embodiment of the invention, the cleaning rods can be provided with a pathway to allow a fluid to pass into the channel to assist in removing and/or preventing the buildup of frost and other foreign matter.

BRIEF DESCRIPTION OF THE DRAWINGS

The following drawings are illustrative of embodiments of the invention and are not intended to limit the invention as encompassed by the claims forming part of the application.

FIG. 6 is an end view of the support mechanism shown in FIG. 5B;

DETAILED DESCRIPTION OF THE INVENTION

The present invention shall be described with respect to a freezer for continuously freezing a food product by contacting the food product with a unidirectional flow of a cooling medium such as cold air, nitrogen or carbon dioxide vapor. It should be understood that the invention is also applicable to an oven for continuously heating a food product with a heating medium such as heated air.

Figure 1:
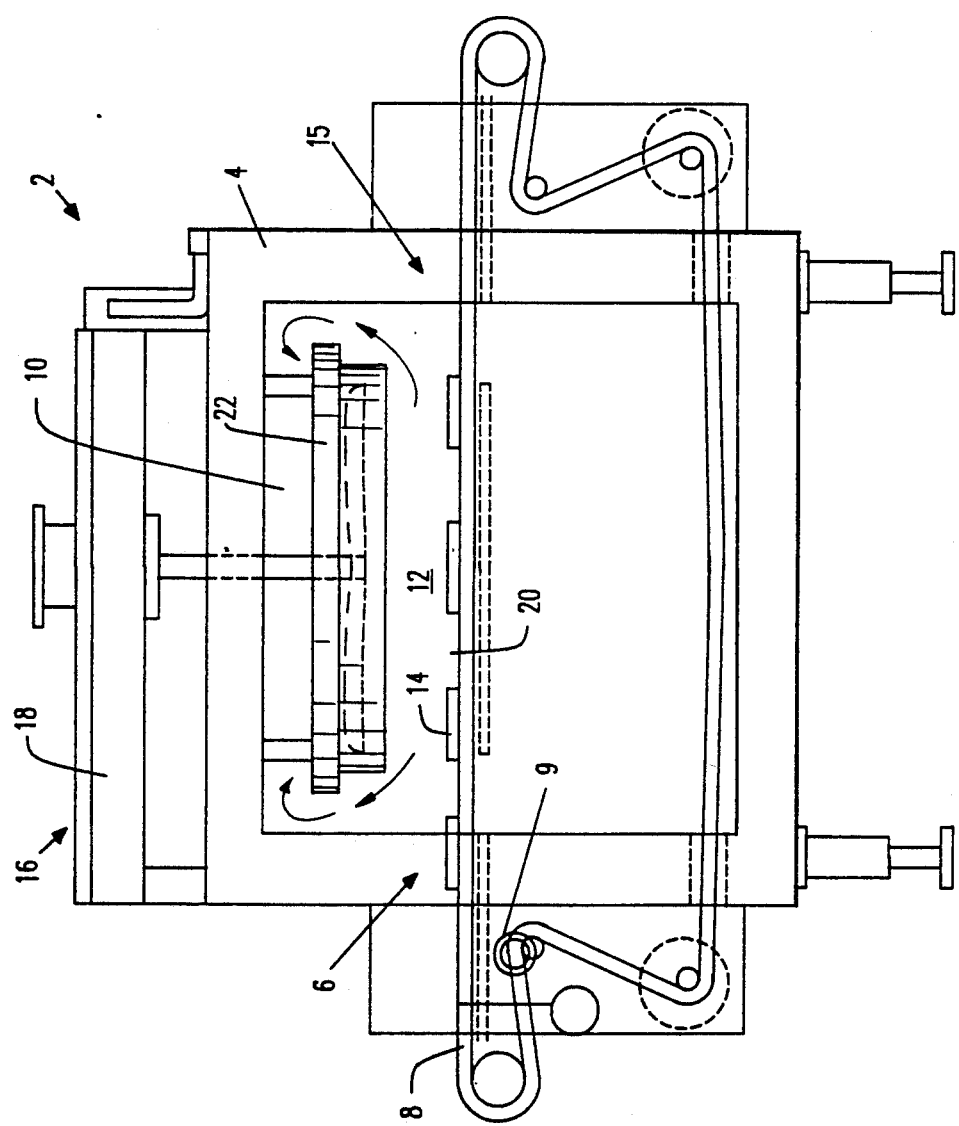
FIG. 1 is a partial side view of a conventional conveyor belt type freezer.

Referring to FIG. 1, there is shown a conventional belt-type commercial freezer customarily employed for freezing food products such as shrimp, chicken, chicken parts, scallops, vegetables, hamburger patties and the like. The freezer 2 includes a housing 4 having an entry port 6 for receiving the food product via a conveyor belt 8 driven by a motor 9. The entry port 6 leads to a freezer section 10 which is in the form of a tunnel 12 where the food product 14 is frozen prior to leaving the freezer 2 via an exit port 15 at the opposite end of the freezer.

A cooling medium is provided to the freezer section 10 in sufficient quantities so that the food product is frozen during passage through the tunnel 12. The cooling medium, such as air cooled by the presence of a liquid cryogen, is generated by a cooling section 16 comprised of a source of coolant 18, an exchange zone 20, and a fan or blower 22.

The source of coolant 18, for example a liquid cryogen (e.g. liquid nitrogen or carbon dioxide) is placed in proximity to the warmed vapor which has given its cooling duty to the food product in the exchange zone 20. The temperature of the warmed vapor is thereby reduced to well below 32° F. (0° C.). The liquid cryogen is preferably sprayed into the exchange zone 20 through a nozzle or header (not shown) and thereby is brought into contact with the moving food product 14 by the downdraft generated by the fan or blower 22. Specifically, the cooling medium is blown by the fan 22 in the general direction of the food product 14 as shown in FIG. 1 in the direction of the arrows. Upon eventual contact with the food product 14, the cooling medium gives off its cooling duty and is then drawn up into and reinserted into the exchange zone 20 by the fan 22 where it is again cooled by contact with the source of coolant 18.

The type of freezer shown in FIG. 1 is disadvantageous because the flow of the cooling medium is multidirectional. While the cooling medium is blown away from the fan 22 in the general direction of the food product, a significant portion of the cooling medium will scatter about the freezer section 10 before contacting the food product. As a result, the flow of the cooling medium loses some of its energy and, therefore, is not efficient in reducing the boundary layer associated with the unfrozen food product. To compensate for this inefficient flow of the cooling medium, it is often necessary to increase the horsepower of the fan or blower which adds significantly to the cost of the process.

The present invention provides for a unidirectional flow of the cooling medium so as to more efficiently reduce the boundary layer. In addition, a cleaning device is provided which prevents the buildup of frost typically associated with prior freezers using conventional tubes and slots to form a unidirectional flow of the cooling medium.

Figure 2:
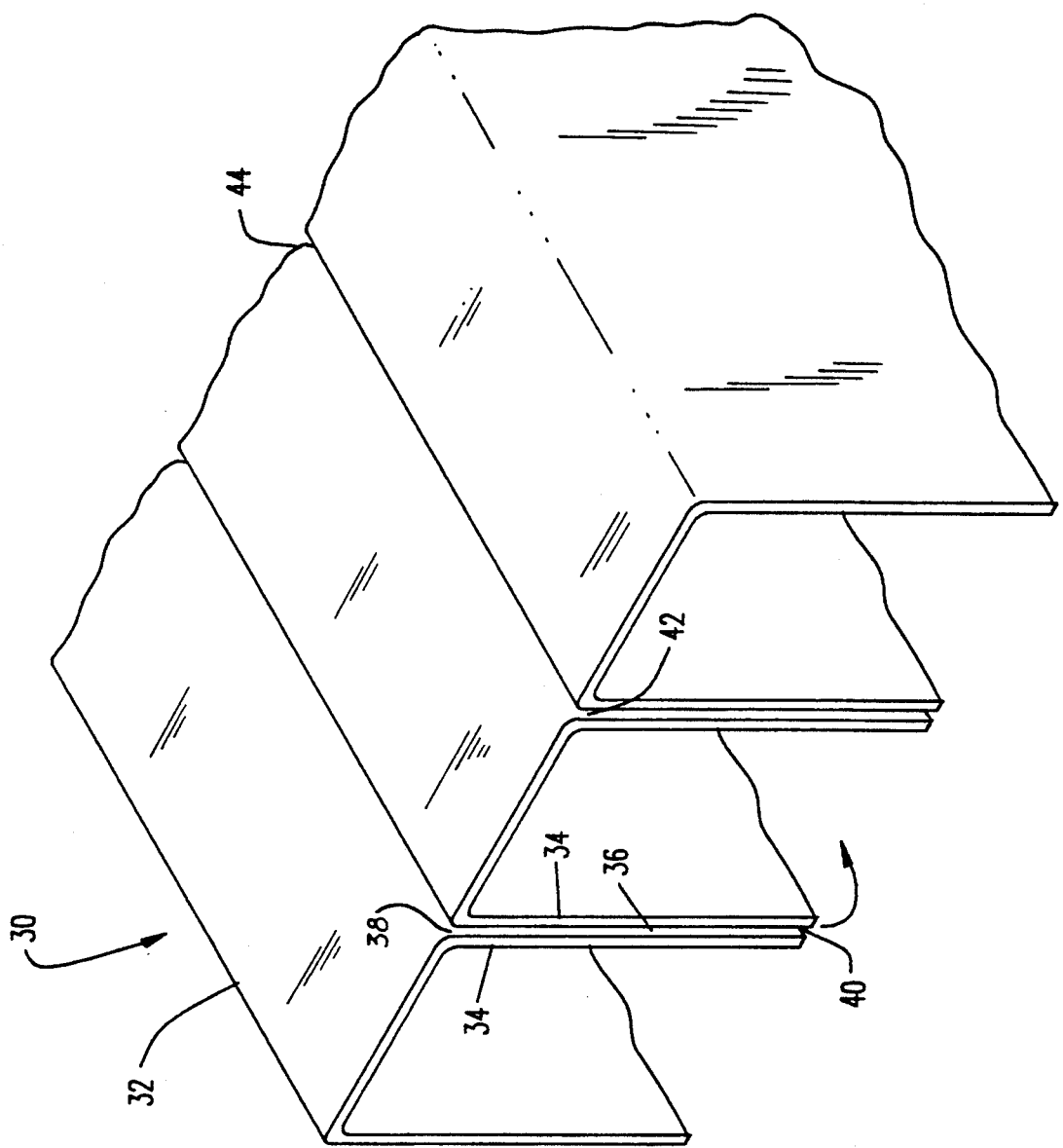
FIG. 2 is a partial perspective view of one embodiment of the device used to form a unidirectional flow of the cooling medium in accordance with the present invention.

Referring to FIG. 2, the present invention includes a device 30 for generating a unidirectional flow of a cooling medium toward a conveyor belt having thereon a food product. The device 30 includes a plurality of parallel, spaced apart inverted U-shaped troughs 32. Each trough 32 has a wall 34 which lies proximate to, but spaced apart from, a corresponding wall 34 of an adjacent trough 32. The space between the walls 34 of adjacent troughs 32 defines a continuous, preferably parallelpiped shaped, channel 36 preferably having a first opening 38 for receiving a multi-directional flow of the cooling medium and a second opening 40 for discharging a unidirectional flow of the cooling medium to the food product.

The unidirectional flow device 30 can be made of a variety of materials including metals such as stainless steel, aluminum and the like, as well as plastics such as polyethylene and polypropylene and the like. The dimensions of the channel 36 are sufficient to establish a straight or unidirectional flow of the cooling medium as it leaves the second opening 40. For this purpose, the height of the channel 36 is generally greater than twice its width. For a typical size commercial freezer, the height of the channel 36 will be in the range of from about 1 inch (2.54 cm) to 12 inches (30.48 cm) and the diameter or cross-sectional length of the channel 36 is typically from about 0.25 inch to 1.00 inch. The length of the channel 36 measured from the front 42 to the rear 44 of the trough 32 is selected to run substantially the full width of the conveyor belt 8, typically about 36 inches (91.44 cm) for a commercial freezer.

The second opening 40 is positioned at a distance from the food product typically in the range of from about 1 to 4 inches (2.54 to 10.16 cm). The distance is chosen so as to insure that the unidirectional flow of the cooling medium is of sufficient velocity to reduce the boundary layer of the food product, but does not move the food product as it passes on the conveyer belt 8.

During continuous operation of the freezer some moisture from the atmosphere and the food product itself will enter the freezer section causing the buildup of condensation in the form of frost on the components of the freezer. In prior art devices, frost builds up on the interior surfaces of the tubes or slots used to produce unidirectional flow. If allowed to continue, the frost buildup will eventually retard and even prevent the flow of the cooling medium to the food product. The buildup of frost affects the rate of freezing by reducing the amount of heat which can be removed from the food product because less of the cooling medium is able to reach the food product.

Figure 3:
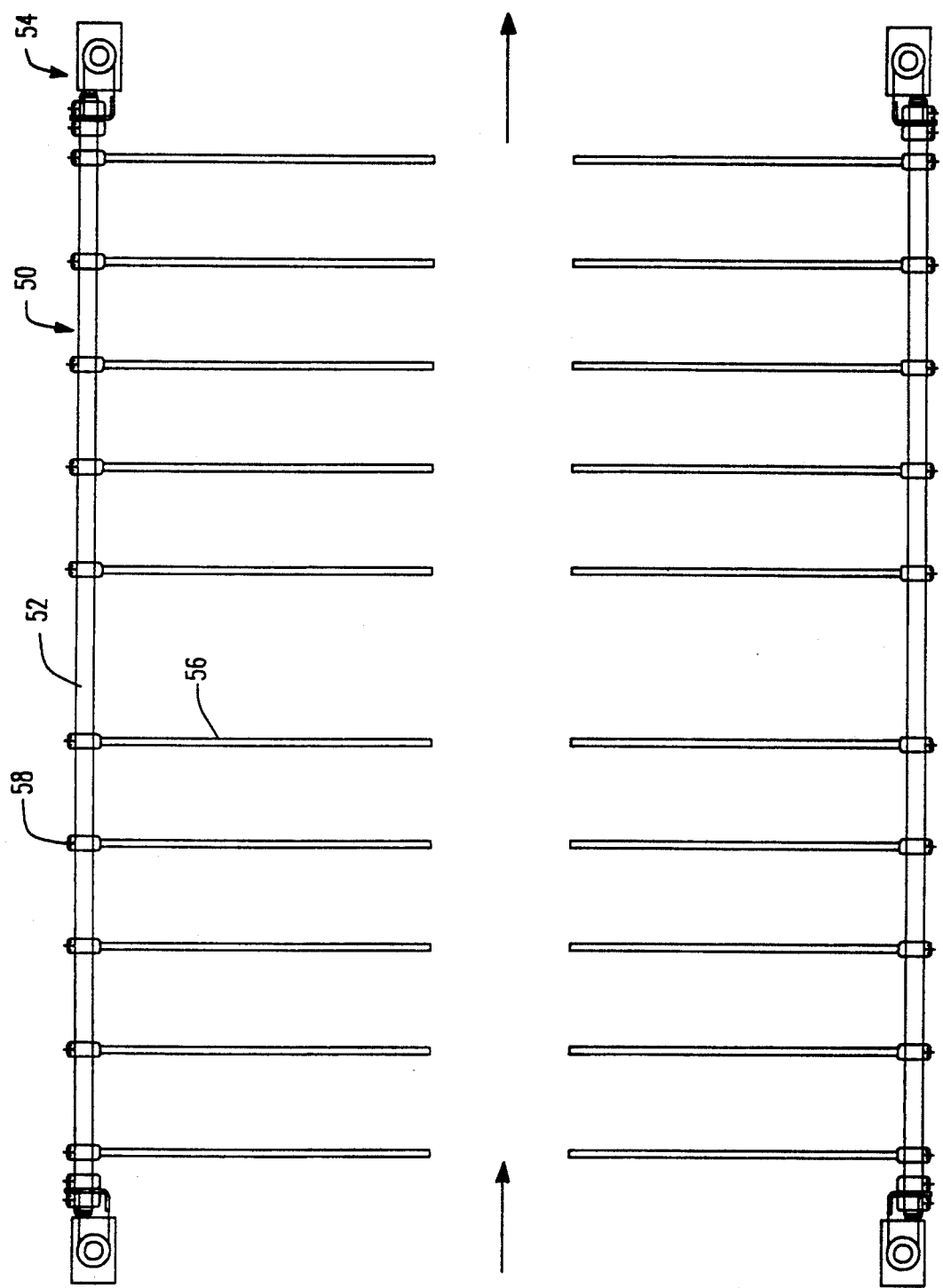
FIG. 3 is an end view of an embodiment of a cleaning assembly in accordance with the invention showing cleaning rods attached to a movable support mechanism.
Figure 4A:
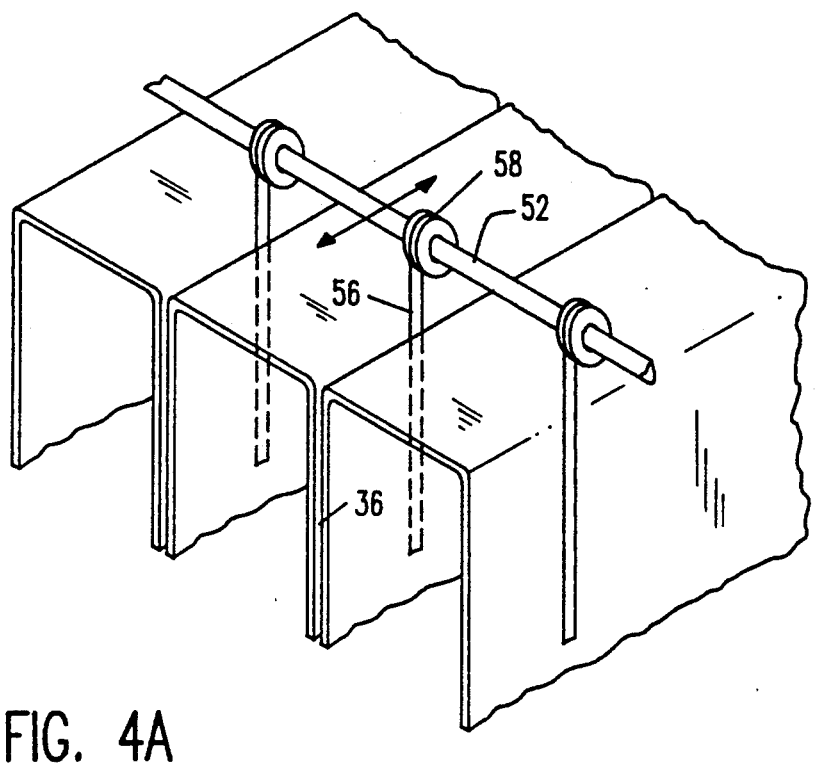
FIG. 4A is a partial perspective view showing the placement of one embodiment of the cleaning rods within channels of the unidirectional flow device shown in FIG. 2 to effect cleaning thereof.
Figure 4B:
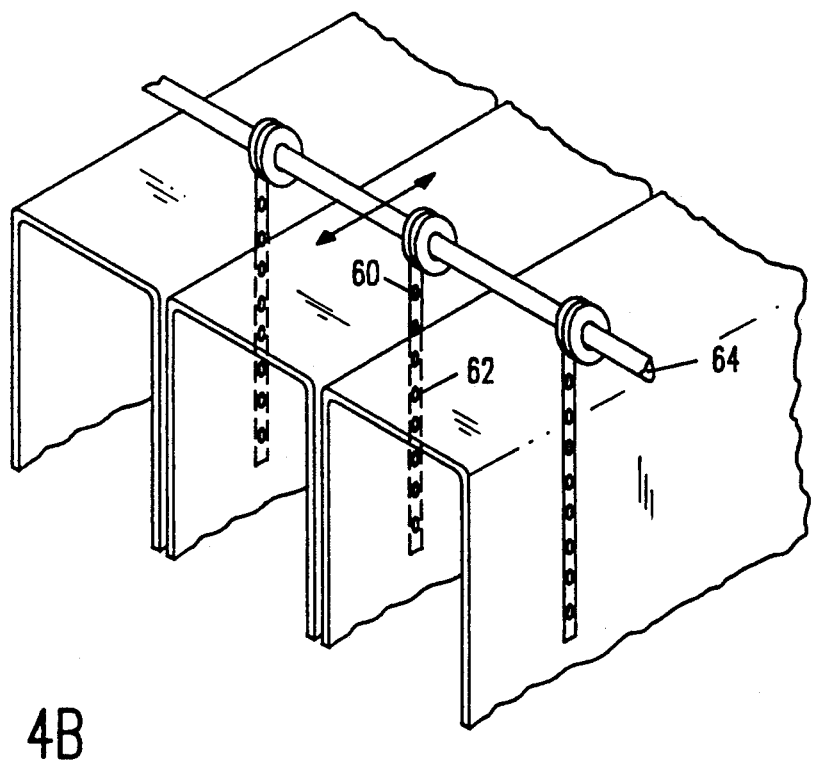
FIG. 4B is a partial perspective view similar to FIG. 4A showing hollow cleaning rods having openings for transmitting a fluid therethrough.

In accordance with one aspect of the present invention, there is provided a cleaning device which is adapted to continually remove foreign matter, including frost, from the channels which are employed for generating unidirectional flow. Referring to FIGS. 3, 4A and 4B, the cleaning device 50 includes a support member, shown as a bar 52 attached at its opposed ends to a conveyor system 54 which is adapted to move the bar 52 along the length of the channels 36 as shown in FIG. 3 and as explained in detail hereinafter.

Attached to the support bar 52 are a number of cleaning rods 56, preferably equally spaced apart, which are adapted to extend into each of the similarly positioned channels 36 along the substantial height thereof. The rods 56 are attached at one end to the bar 52 by a clamp 58 or other suitable attachment mechanism such as a collar (see FIG. 4A) and the like.

The length of the rod is sufficient so that it extends substantially the full height of the channel 36 as shown best in FIG. 4B. The width of the rod is sufficient to enable the rod 56 to contact the walls 34 of the channel 36 as the rod is moved along the length of the channel 36 by the conveyor 54 so as to remove frost or other foreign matter contained therein. Accordingly, the width or diameter of the rods is slightly less than the width or diameter of the channels 36 [i.e. in the range of about 0.25 to 1.00 inch (0.63 to 2.54 cm)].

In another embodiment of the invention, the rods 56 may be provided with a passageway for transmitting a fluid such as air from a source into the channels 36 to assist in preventing and/or removing frost and other foreign matter. Referring to FIG. 4B, the rods 56 are provided with a passageway 60 leading to a plurality of spaced apart openings 62 extending along the length of the rod 56. The fluid is fed into the passageway 60 of the rod 56 from a corresponding passageway 64 of the supporting bar 52 or in any other suitable manner. The pressure of the fluid supplied to the rod 56 should generate a flow of fluid out of the openings 62 sufficient to prevent and/or remove foreign matter which adheres to the interior of the walls 34 of the channel 36.

The cleaning device 50 is adapted to clean the entire volume of the parallelpiped shaped channels 36. Accordingly, the rods 56 must be moved along substantially the entire length of the channel 36 which traverses the width of the conveyor belt 8. In one embodiment of the invention, as best shown in FIG. 3, a single bar 52 is provided for moving a single row of rods 56 along the entire length of the channel 36. As shown in FIG. 3, it is often desirable to cool the food product from above and below the conveyor belt 8 as shown by the arrows indicating the movement of the food product. Therefore, it is preferred to provide unidirectional flow devices 30 and corresponding cleaning devices 50 both above and below the conveyor belt 8, with each single row of rods moving the entire length of the channel 36.

Movement of the cleaning rods 56 along the length of the channels 36 is accomplished by a guidance system 66 for guiding the rods in a precise linear path and a system 68, either a pneumatic system or a hydraulic system, but preferably a pneumatic system, for supplying the force necessary to move the rods 56. Hereinafter, all reference to the system 68 shall be limited to a pneumatic system. It shall be understood, however, that the force necessary to move the rods 56 can be supplied by a hydraulic system as well. Together the guidance system 66 and the pneumatic system 68 comprise the conveyor system 54.

Figure 5A:
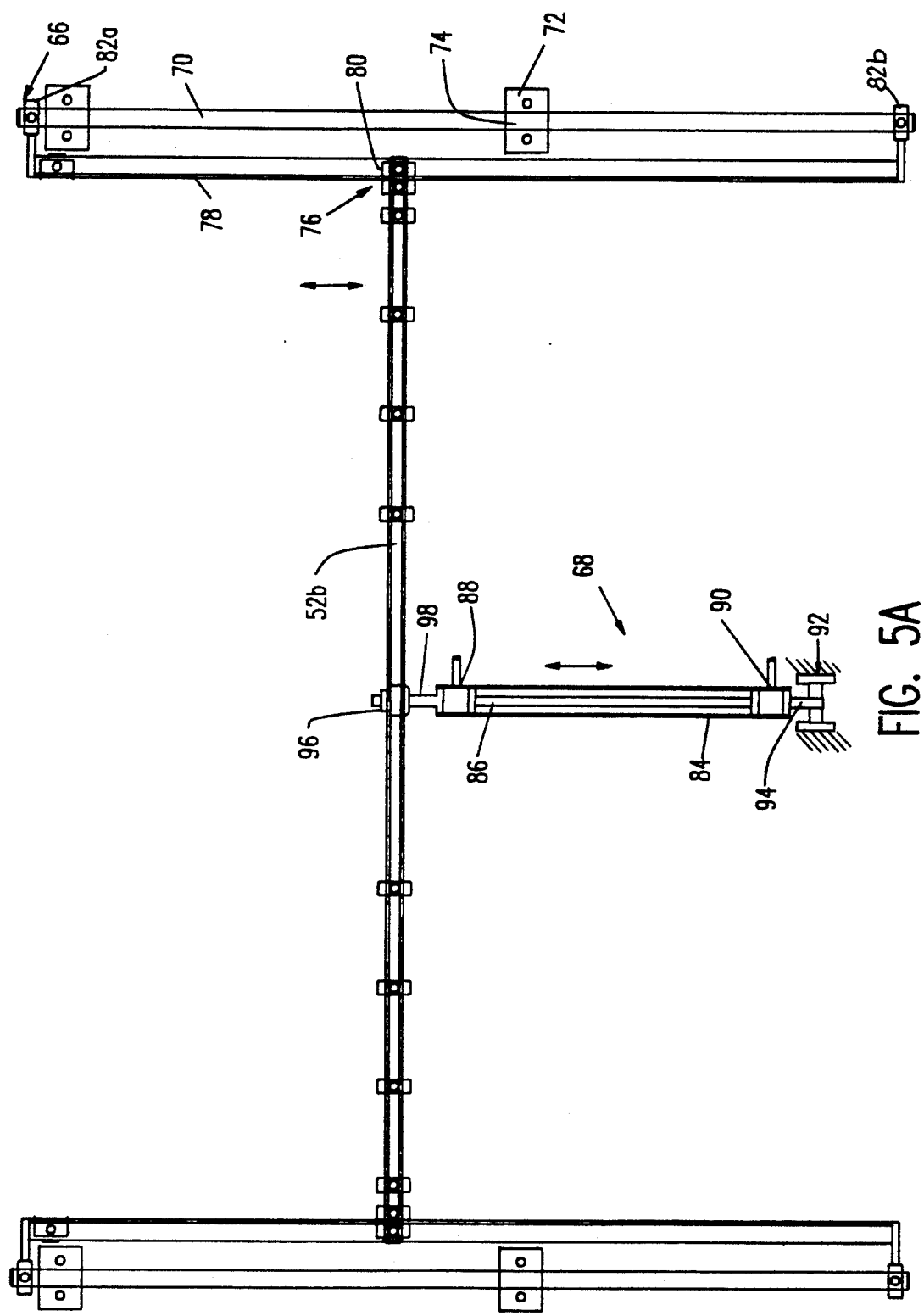
FIG. 5A is a top view of a support mechanism for supporting the cleaning rods and a conveyor mechanism for guiding one row of the cleaning rods along the length of the corresponding channels.

In the embodiment shown in FIG. 5A, the single support bar 52 must be moved along the entire length of the channels 36. Accordingly, the pneumatic system 68 must be of sufficient size to provide the appropriate movement for the support bar 52. Smaller pneumatic systems may be used by modifying the cleaning device to include more than one row of cleaning rods, with each row moving only a fraction of the length of the channels. In this way, the size and cost of the pneumatic system 68 can be minimized.

Figure 5B:
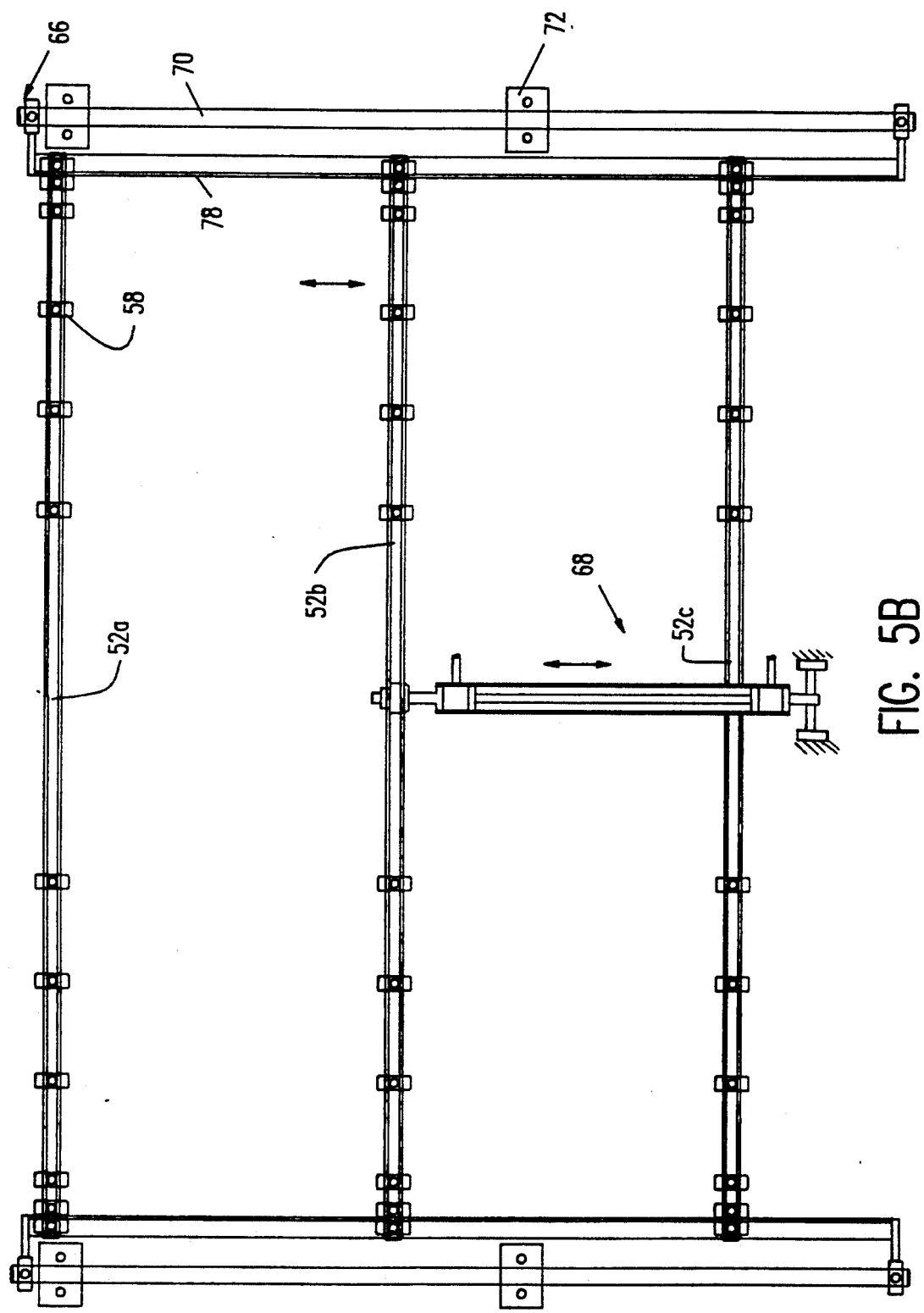
FIG. 5B is a top view similar to FIG. 5A showing a support mechanism and conveyor mechanism for guiding three rows of cleaning rods along the length of the corresponding channels.

Referring to FIGS. 5B and 6, there is shown an embodiment of the cleaning device in accordance with the present invention employing three rows of cleaning rods 36a–36c.

Referring to FIG. 5A, the guidance system 66 comprises a guide rod 70 positioned within the freezer section 10 by guide blocks 72 having an opening 74 allowing movement of the rod 70 therethrough. The guidance system 66 also includes a device 76 for attaching the guide rod 70 to the support bar 52. The device 76 includes a beam 78 which runs parallel to the guide rod 70 and is attached to the support bar 52 by a clamping device 80. The ends of the beam 78 extend at a right angle toward the guide rod 70 and are attached thereto by clamps 82a and 82b.

Movement of the support bar 52 is accomplished by the pneumatic system 68 which includes a pneumatic cylinder. The pneumatic cylinder 84 houses therein a piston 86 which is shorter than the cylinder and, therefore, the piston is movable within the cylinder. The cylinder has opposed openings 88 and 90 for receiving and discharging air (or other gas) which is used to move the piston within the cylinder. The cylinder is attached at one end to the housing 4 of the freezer 2 by a bracket 92 and an extension 94 attached to the piston 86, and at the opposed end to the support bar 52 by a bracket 96 and a corresponding extension 98 of the piston 86. The pneumatic system 68 operates by pumping air alternatively into the openings 88 and 90 to move the piston 86 forward and backward, respectively, within the cylinder 84 and, therefore, move the support bar 52 in the same direction. More specifically, when air is pumped into the opening 90, it exerts a force on the piston 86 moving the piston forward. The piston 86 exerts pressure against the support bar 52 thereby moving the bar 52 in the same direction.

As previously indicated, the support bar 52 is attached to the guidance system 66 via the beam 78 and clamps 80a and 80b. Accordingly, as the piston 86 moves forward, the guidance system 66 including the guide bar 70 moves in the same direction as the piston 86. A precise linear path is maintained because the guide bar 70 is aligned during movement by the guide blocks 72.

The guidance system 66 is moved in the opposite direction by reversing the flow of the air. If air is pumped into the opening 88, the piston 86 will move backwards causing like movement of the guidance system 66 as well as the support bar 52.

Referring to FIG. 5B, three rows of cleaning rods 36a–36c are supported by three corresponding bars 52a–52c through collars 58. One end of the pneumatic system 68 is attached to the middle bar 52b. The bars 52a–52c are moved by the guidance system 66 and the pneumatic system 68 in the same manner as described in connection with the embodiment of FIG. 5A. However, each bar 52a–52c moves only about one-third the length of the channels 36, thereby reducing the size of the pneumatic system 68.

Accordingly, the cleaning device 50 can be constructed so that each row of cleaning rods moves a designated fraction of the length of the channels 36. Employing multiple rows of cleaning rods in this manner allows use of a smaller pneumatic system which is less costly than a single pneumatic system which must move the entire width of the conveyor belt.

Figure 7:
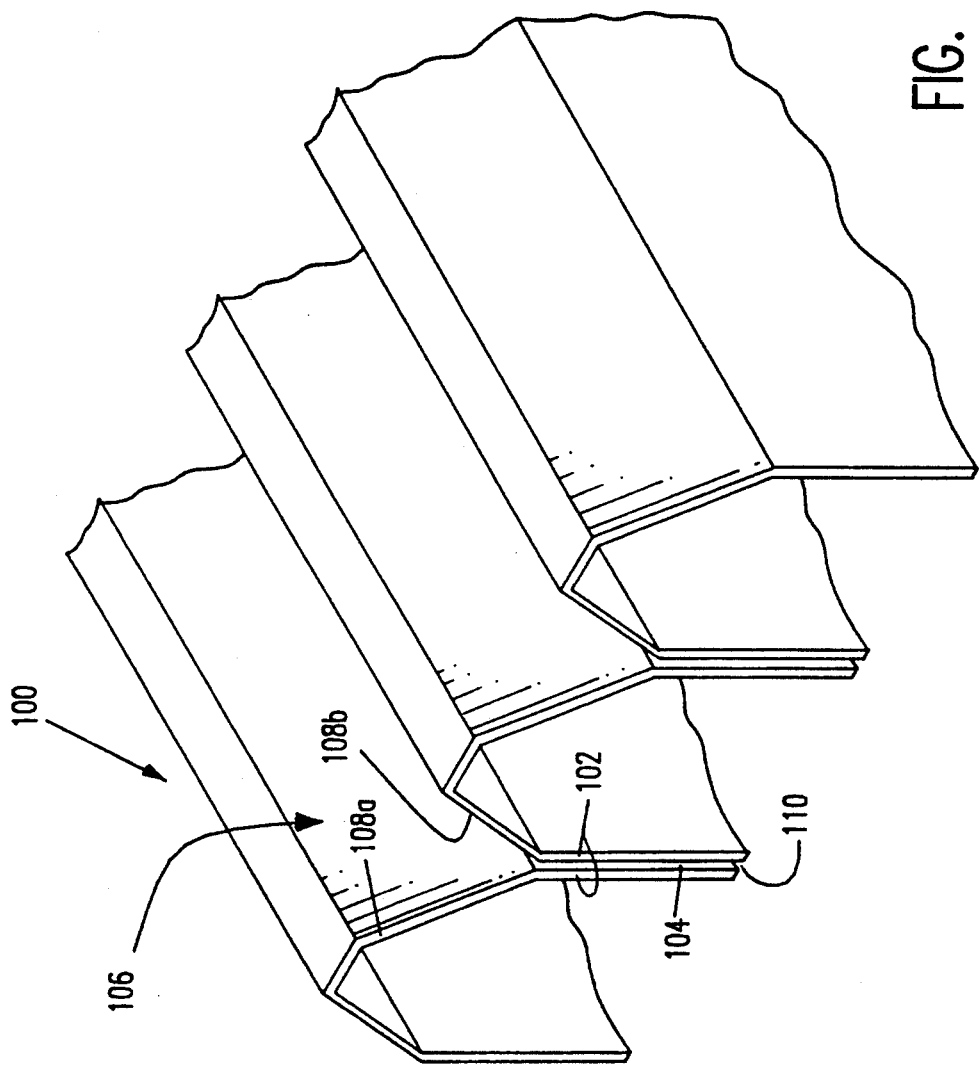
FIG. 7 is another embodiment of the unidirectional flow device wherein the opening for receiving the cooling medium into the channels is of greater cross-sectional area than the opening for discharging the cooling medium from the channels onto the food product.

The unidirectional flow device 30 can be modified to provide an even more effective transition from multidirectional to unidirectional flow. Referring to FIG. 7, there is shown a unidirectional flow device 100 in accordance with a preferred aspect of the invention in which the entrance to the channels is expanded to accommodate a greater volume of the cooling medium and to better facilitate the transition from multidirectional to unidirectional flow. The device 100 has adjacent walls 102 forming a channel 104, preferably in the shape of a parallelpiped. The first opening 106, unlike the unidirectional flow device shown in the embodiment of FIG. 2, is formed by a pair of diverging walls 108a and 108b so that the cross-sectional area of the first opening 106 is greater than the second opening 110 which leads to the food product.

Expanding the cross-sectional dimension of the first opening 106 facilitates the manner in which the cooling medium is funneled into the channel 104. The larger opening permits a greater quantity of cooling medium to enter the channel 104 and, therefore, generates a more efficient stream of the cooling medium out of the second opening 110. In addition, the pressure drop through the channels 104 is reduced thereby reducing the horsepower needed to drive the cooling medium through the channels 104.

Expanding the cross-sectional area of the opening 106 also reduces the likelihood of moisture buildup within the channel 104. This is because moisture buildup on the diverging wall 108a and 108b will not obstruct the flow of the cooling medium through the channel 104.

Figure 8:
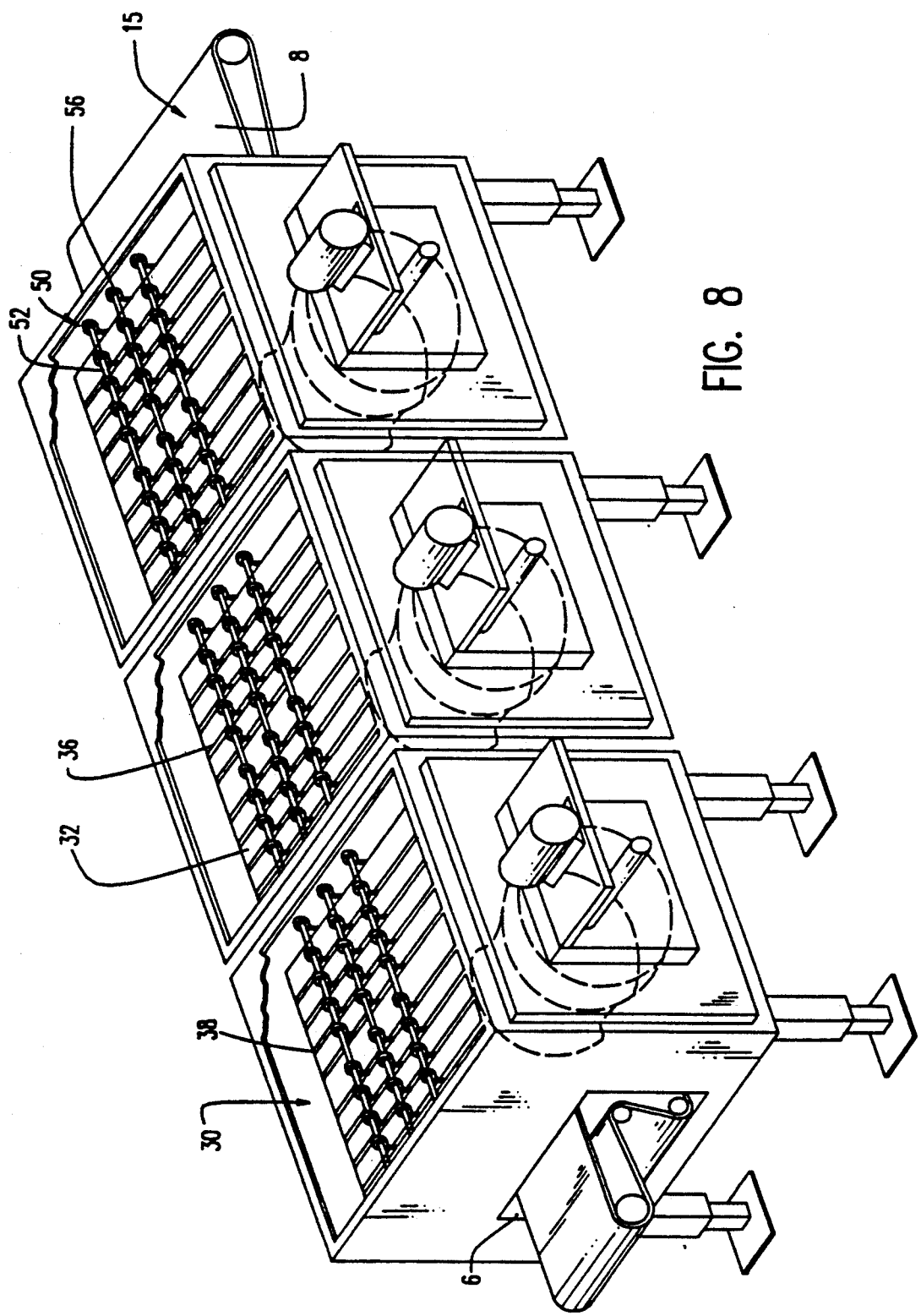
FIG. 8 is a perspective view of an impingement type freezer having three freezer sections each employing both the unidirectional flow device and the cleaning device of the present invention.

In another embodiment of the invention as shown in FIG. 8, multiple unidirectional flow devices and corresponding cleaning devices may be housed in a single freezer. As shown specifically in FIG. 8, three pairs of such devices are positioned within a single freezer section 10. Each pair of devices occupies approximately ⅓ of the length of the freezer section 10 and functions as described previously in connection with the embodiments of FIGS. 2–7.

Figure 9:
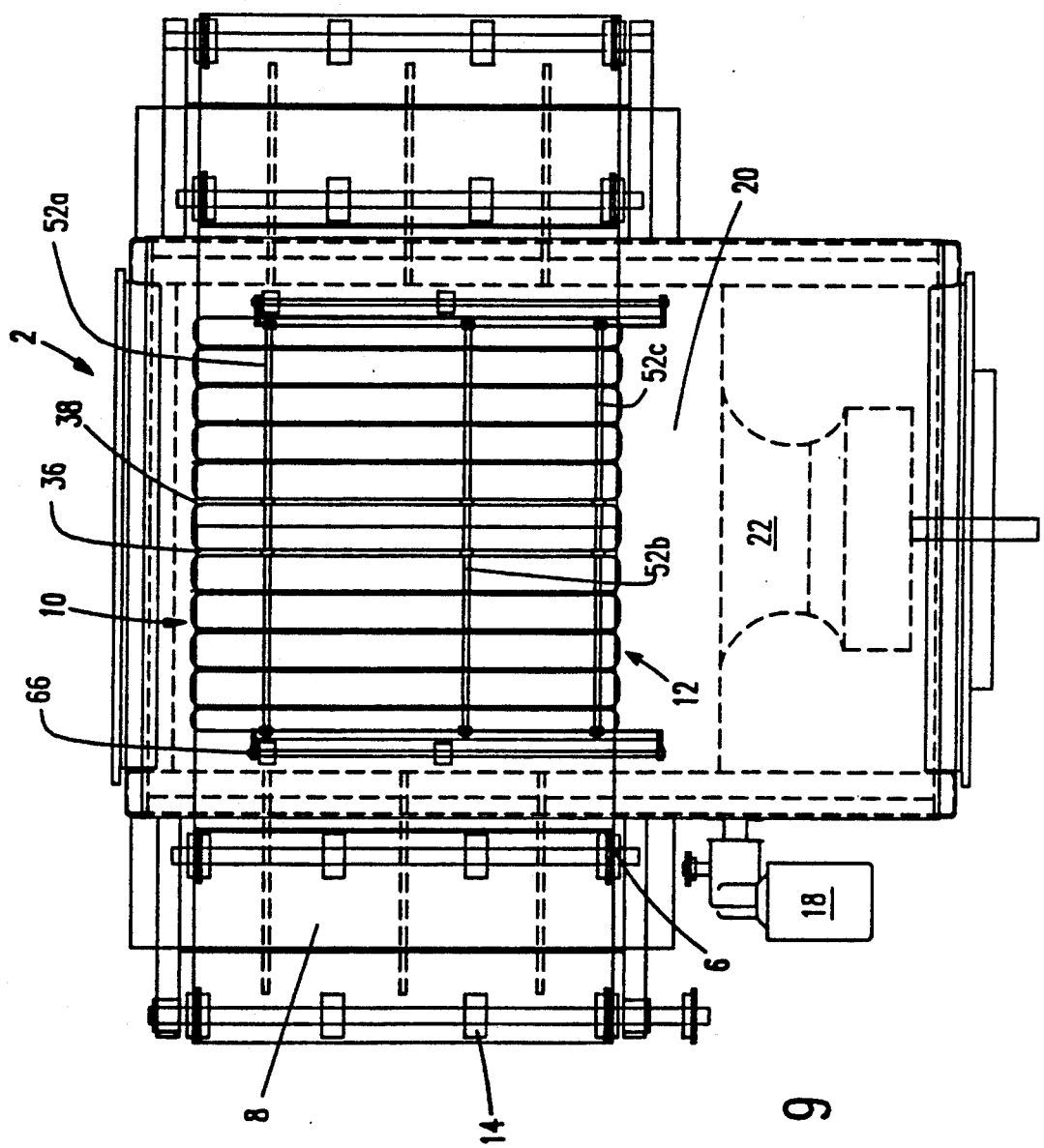
FIG. 9 is a top view of one freezer section of the type shown in FIG. 8 showing the cleaning rods positioned in the channels.

The operation of the present invention can be best explained by reference to FIGS. 2, 3, 7–0. FIG. 9 shows an embodiment of the invention with one unidirectional flow device and cleaning device contained within the freezer section. Unfrozen food product 14 enters the freezer 2 on a conveyor belt 8 through the opening 6 where it is transported to the freezer section 10 through the tunnel 12. Positioned above and/or below (see FIGS. 8 and 9) the conveyor belt 8 is at least one unidirectional flow device 30, preferably operatively associated with a cleaning device 50 of the present invention. The freezer section 10 receives a multidirectional flow of the cooling medium from the exchange zone 20 via the fan 22 as shown best in FIG. 9 which enters the first opening 38 of the flow device as shown best in FIG. 8. The cooling medium which enters the channel 36 is transformed into a unidirectional flow as it passes through the channel 36 and out the second opening 40 (see FIGS. 2 and 7).

Upon leaving the second opening 40, the cooling medium comes into immediate contact with the food product and gives off its cooling duty while being deflected into the trough 32 where it is drawn back to the exchange zone 20 and is provided with additional coolant to lower the temperature thereof.

During operation of the freezer 2, moisture can enter the freezer from a number of locations, principally through the opening 6 for receiving the unfrozen food product and from the food product 14 itself. The moisture condenses on various components of the freezer causing the buildup of frost. The channels 36 of unidirectional flow device 30 are particularly susceptible to the buildup of frost and must therefore be cleaned.

Prevention of frost buildup is accomplished by the cleaning device 50. As the food product 14 moves on the conveyor 8, the cleaning rods 56 are guided along the length of the channels 36 by the guidance system 66 through the power provided by the pneumatic system 68.

In the embodiment shown best in FIG. 8, each channel 36 is cleaned by three cleaning rods, each adapted to travel about one-third of the total length of the channel. This configuration reduces the size of the pneumatic requirements and, therefore, lowers the cost of the freezing operation. The rods 56 are supported on three supporting bars 52a–52c, respectively. The bars move in unison with each other and thereby clean the entire channel while each rod travels only one-third the length of each channel.

The speed of the bars, and therefore of the rods, is sufficient to prevent the buildup of frost while not interfering with the flow of the cooling medium through the channel. Preferably, the bars move at the rate of about 0.5 to 10 ft/min. Movement of the bars need not be continuous. For example, the bars may be moved intermittently during their travel along the length of the channel or may be discontinued for a period of time. The selection of a suitable mode of operation and travel speed will be dependant on the rate of frost buildup in the freezer.

EXAMPLE

A standard belt-type freezer of the type shown in FIG. 1 was employed to generate data for determining the amount of time needed to freeze a hamburger patty measuring 4.5 inches (11.43 cm) in diameter, 0.5 inch (1.27 cm) thick and weighing 4 ounces (113 grams). The heat transfer coefficient for this type of freezer was determined to be 7 BTUs/lb-ft$^2$-° F. [40 W÷(m$^2$-° C.)].

The food product enters the freezer at 30° F. (−1° C) and must exit the freezer at 0° F. (−18° C). As a result 28 BTUs (29.5 Kjoules) of heat must be removed from the hamburger patty. The freezer section is operated at −80° F. (−62° C.) and it will take approximately 11.5 minutes to freeze the hamburger patty to 0° F. (−18° C).

The impingement type freezer of the present invention was determined to have a heat transfer coefficient of 17 BTUs/lb-ft$^2$-° F. [96.5 W÷(m$^2$−° C.0]. Operating under the same conditions as described for the standard belt-type freezer, the same hamburger patty will freeze to 0° F. (−18° C.) in only 4.7 minutes.

What is claimed is:

1. A device for transmitting a heating or cooling medium to a food product on a moving substrate comprising:
(a) at least one continuous channel traversing at least a major portion of the width of the moving substrate, said channel having a first opening for receiving a multidirectional flow of the heating or cooling medium and a second opening for discharging the heating or cooling medium in a unidirectional flow toward the moving substrate.

2. The device of claim 1 wherein the channel is in the shape of a parallelpiped.

3. The device of claim 1 wherein the height of the channel is at least twice the width of the channel.

4. The device of claim 1 wherein the cross-sectional area of the first opening is greater than the cross-sectional area of the second opening.

5. The device of claim 4 wherein the first opening is V-shaped.

6. The device of claim 1 further comprising cleaning means insertable into said channel and movable along at least a portion of the length of the channel for removing or preventing the presence of foreign matter within the channel.

7. The device of claim 6 wherein the cleaning means further comprises at least one support member extending substantially perpendicular to the channel for supporting the cleaning means within the channel, and means for moving the at least one support member along the length of the channel.

8. The device of claim 7 comprising a plurality of spaced apart channels traversing a substantial portion of the moving substrate, said cleaning means comprising at least one rod extending into and substantially the entire height of each of the channels and being adapted to contact the walls of the channels during movement of the cleaning means along the length of the channel.

9. The device of claim 8 comprising a plurality of rows of said rods, each rod of each row extending into and along substantially the entire height of the respective channel, each row of rods adapted to move along a fraction of the length of the channel wherein the entire length of each channel is traversed by the combined movement of each row of rods.

10. The device of claim 7 further comprising guide means for guiding the cleaning means in at least a substantially linear path along the length of the channels.

11. The device of claim 10 wherein the guide means comprises, a guide beam extending parallel to the channels and a guide block having an opening for permitting the guide beam to travel in said linear path, and means for securing the at least one support member to the guide beam so that the support member moves in unison with the guide beam.

12. The device of claim 7 wherein the means for moving the at least one support member comprises a pneumatic means attached at one end to one of the support members and adapted to urge the at least one support member forward or backward along the length of the channels.

13. The device of claim 8 wherein the at least one rod has a passageway therein for receiving a fluid and at least one opening for discharging the fluid into the channel.

14. A device for heating or cooling a food product comprising:
(a) an entry port for receiving a food product;
(b) conveyor means for transporting the food product from the entry port to an exit port.
(c) means for generating a multidirectional flow of a heating or cooling medium; and
(d) a food treatment section traversed by the conveyor means and comprising at least one continuous channel traversing at least a major portion of the width of the conveyor means, said channel having a first opening for receiving the multidirectional flow of the heating or cooling medium and a second opening for discharging the heating or cooling medium in a unidirectional flow toward the conveyor means.

15. The device of claim 14 wherein the channel is in the shape of a parallelpiped.

16. The device of claim 14 wherein the height of the channel is at least twice the width of the channel.

17. The device of claim 14 wherein the cross-sectional area of the first opening is greater than the cross-sectional area of the second opening.

18. The device of claim 17 wherein the first opening is V-shaped.

19. The device of claim 14 further comprising cleaning means insertable into said channel and movable along at least a portion of the length of the channel for removing or preventing the presence of foreign matter within the channel.

20. The device of claim 19 wherein the cleaning means further comprises at least one support member extending substantially perpendicular to the channel for supporting the cleaning means within the channel, and means for moving the at least one support member along the length of the channel.

21. The device of claim 20 comprising a plurality of spaced apart channels traversing a substantial portion of the conveyor means, said cleaning means comprising at least one rod extending into and along substantially the entire height of each of the channels and being adapted to contact the walls of the channels during movement of the cleaning means along the length of the channel.

22. The device of claim 21 comprising a plurality of rows of said rods, each rod of each row extending into and along substantially the entire height of the respective channel, each row of rods adapted to move along a fraction of the length of the channel wherein the entire length of each channel is traversed by the combined movement of each row of rods.

23. The device of claim 20 further comprising guide means for guiding the cleaning means in at least a substantially linear path along the length of the channels.

24. The device of claim 23 wherein the guide means comprises, a guide beam extending parallel to the channels and a guide block having an opening for permitting the guide beam to travel in said linear path, and means for securing the at least one support member to the guide beam so that the at least one support member moves in unison with the guide beam.

25. The device of claim 20 wherein the means for moving the at least one support member comprises a pneumatic means attached at one end to one of the support members and adapted to urge the at least one support member forward or backward along the length of the channels.

26. The device of claim 21 wherein the at least one rod has a pathway therein for receiving a fluid and at least one opening for discharging the fluid into the channel.

27. The device of claim 14 in which the food treatment section is a freezer and the continuous channel discharges a cooling medium in a unidirectional flow toward the conveyor means.

28. A method of heating or cooling a food product comprising:

passing a multidirectional flow of a heating or cooling medium into at least one continuous channel traversing at least a major portion of the width of a moving substrate having thereon said food product, and discharging the heating or cooling medium in a unidirectional flow through a second opening toward the food product on said moving substrate.

29. The method of claim 28, further comprising inserting at least one cleaning rod into said at least one continuous channel and moving the cleaning rod over substantially the entire length of the at least one channel to remove or prevent the presence of foreign matter.

* * * * *